(No Model.)

M. W. ILES.
APPARATUS FOR SEPARATING MATTE FROM SLAG.

No. 494,571. Patented Apr. 4, 1893.

WITNESSES:

INVENTOR:

UNITED STATES PATENT OFFICE.

MALVERN W. ILES, OF DENVER, COLORADO.

APPARATUS FOR SEPARATING MATTE FROM SLAG.

SPECIFICATION forming part of Letters Patent No. 494,571, dated April 4, 1893.

Application filed July 28, 1892. Serial No. 441,462. (No model.)

*To all whom it may concern:*

Be it known that I, MALVERN W. ILES, of Denver, county of Arapahoe, State of Colorado, have invented a certain new and useful Improved Apparatus for Separating Matte from Slag, of which the following is a true and exact description, reference being had to the accompanying drawings, which form a part of this specification.

My invention relates to the separation of matte from slag in admixture with which it leaves the smelting furnace.

In another application filed by me March 5, 1892, Serial No. 423,837, I have described a process and apparatus in their leading features similar to those hereinafter described, that is to say; I there describe and claim the process of transferring the mixed matte and slag from a blast furnace to an independently heated furnace, preferably of the reverberatory type, in which the slag is maintained in a highly fluid condition until the matte settles from it and accumulates at the bottom of the furnace, the matte being tapped off from the bottom and the slag run off from the top. In said application appropriate mechanical devices for the carrying out of the process are also claimed.

My present invention relates to a different arrangement and combination of the devices primarily intended for use in the process, but also having, in part, capacity for separate use.

The nature of my improvements will be best understood as described in connection with the drawings in which they are illustrated, and in which—

Figure 1:
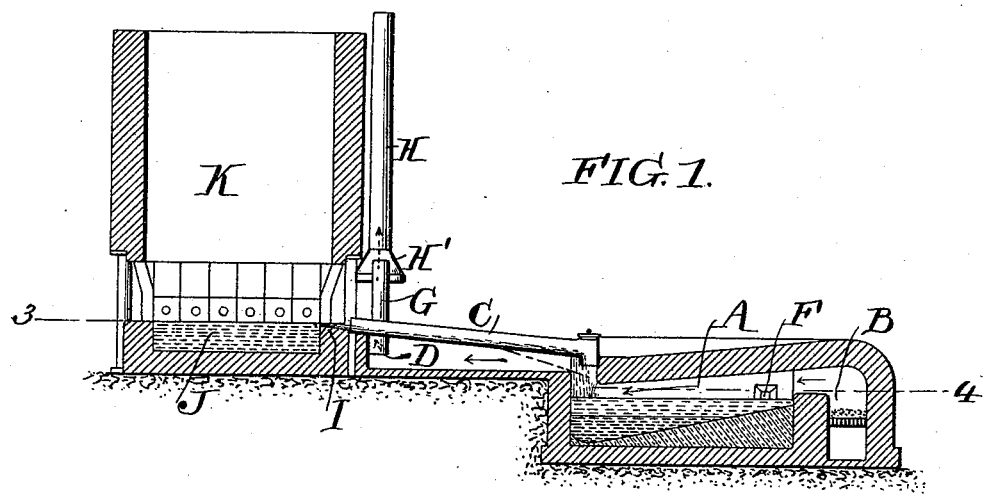
Figure 2:
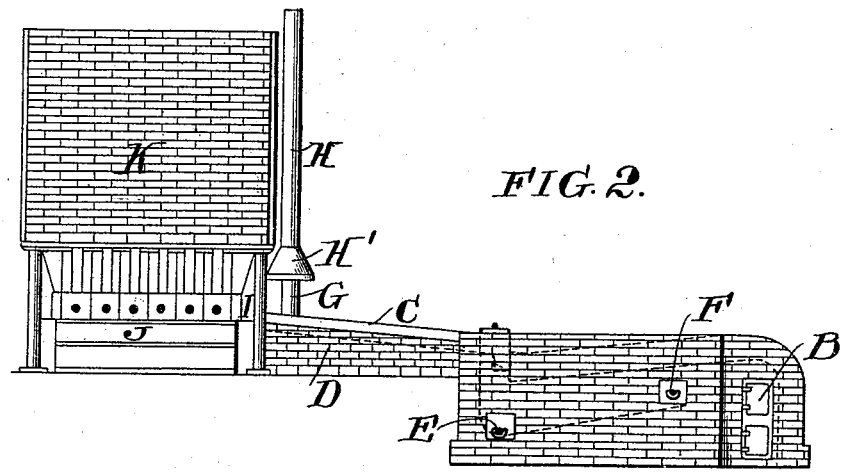
Figure 3:
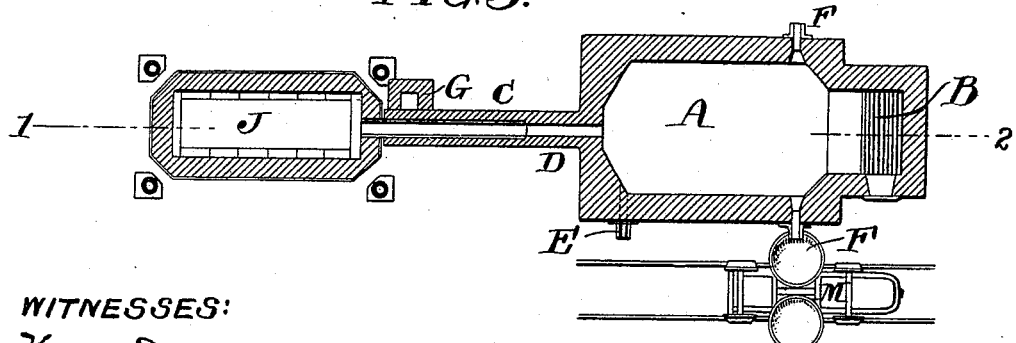

Figure 1 is a side elevation of a blast furnace and auxiliary furnace embracing my improvements taken on the section line 1—2 of Fig. 3. Fig. 2 is a side elevation of the same devices, and Fig. 3 a cross-section on irregular line 3—4 of Fig. 1.

K is the blast-furnace of the ordinary cupola type provided with a crucible J in which the metal smelted from the ore accumulates, and from which it is drawn by any of the several well-known devices for that purpose. The furnace also has a tap hole I for withdrawing the slag which floats upon the metal, and which carries with it a considerable percentage of matte.

Near and preferably at a somewhat lower level than the furnace K,—I place an independently heated furnace A preferably of the reverberatory type, as shown, said furnace having a fire place B at one end and a smoke conduit D leading from its other end; and having also a tap hole E at its bottom for matte, and slag holes F near its top. The matte carrying slag from the furnace K is carried to the furnace A preferably by an inclined conduit C leading from a point adjacent to the tap hole I to furnace A, as shown, and I keep this conduit heated, so that the slag will not chill in it, by carrying the flue D of furnace A along in contact with it so that the heat of the gases are imparted to the conduit and its contents.

In order to protect the workmen from the poisonous metallic fumes arising from the tap, and also because I desire to save these fumes, I provide above the tap hole I a hood H' connecting with a conduit or stack H by which the gases and fumes arising from the tap hole are drawn off; preferably the stack H connects with the flue system of the blast furnaces or to some screening devices whereby the metallic fumes can be saved.

I have shown a connection G leading from the flue D to stack H; this is valuable because it is desirable to maintain a constant draft in stack H by thus connecting it with a constantly acting furnace such as A, this is secured, and it is also desirable because the fume from furnace A is then carried to stack H and off through it.

The connection of the furnace A with a stack H which can be connected to the dust chambers of the blast furnace s or not at will is also advantageous, because of the fact that it becomes necessary from time to time to suspend the blast furnace operations from various causes in which case the stack G, or G and H enables me to keep the contents of the furnace in a liquid condition until the blast furnaces are again started up; or if I desire to empty the furnace A, I keep the mixed matte and slag in it liquid a time sufficiently long for the separation of the matte particles from the slag, and then I tap the matte at hole E—closing said hole when slag begins to flow from it, I remove the matte receptacle, and then I draw off the slag into a separate receptacle.

Having now described my invention, what I claim as new, and desire to secure by Letters Patent, is—

1. The combination with a smelting furnace having a tap hole I for slag of a hood H' arranged above said tap hole, a stack H leading from said hood, and a conduit G leading into the stack H from an independent furnace.

2. The combination with a smelting furnace having a slag tap hole I of a furnace A, provided with independent means for heating it a conduit C leading from the blast furnace to the furnace A, and a flue leading from furnace A along and in contact with the conduit.

3. The combination with a smelting furnace having a slag tap hole I of a furnace A, provided with independent means for heating it a conduit leading from the smelter to the furnace A, a hood H' and stack H situated above the slag tap, and a flue leading from furnace A along and in contact with the conduit, said flue connecting with stack H.

MALVERN W. ILES.

Witnesses:
JOHN M. WALKER,
F. D. FRENCH.